Figure 1:
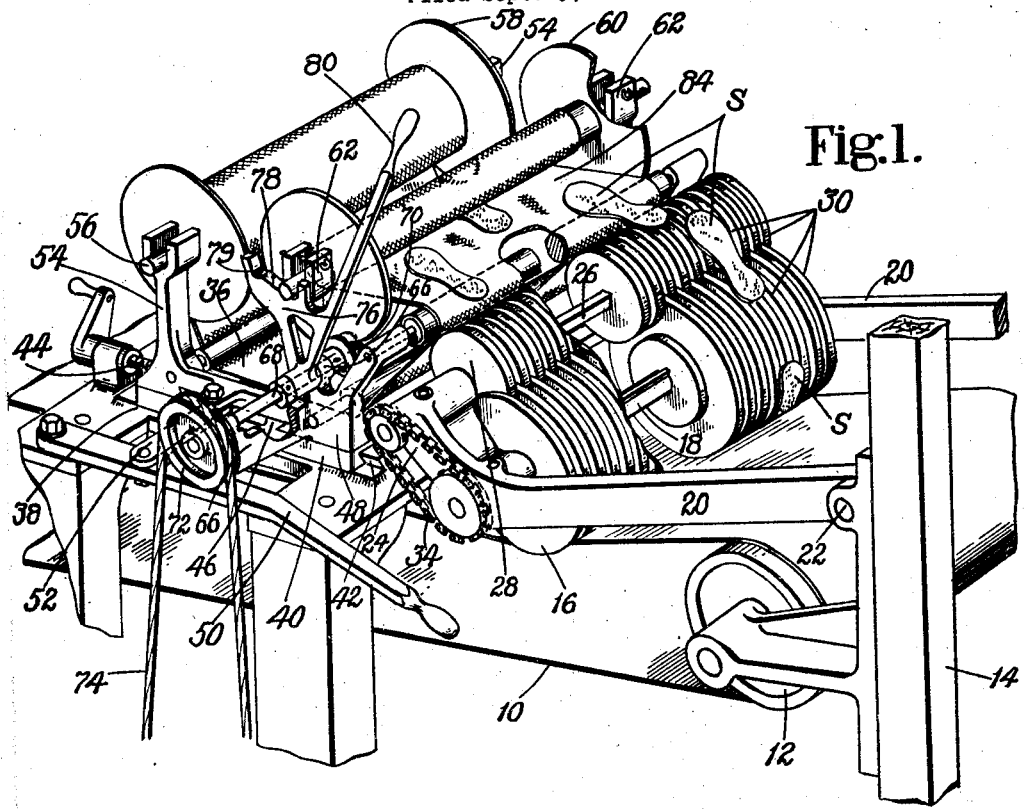

Nov. 2, 1926.  
L. FARNUM ET AL  
1,605,334  
CEMENTING SYSTEM  
Filed Sept. 5, 1924

INVENTORS.  
Lewy Farnum.  
John M. Gorgurn

Patented Nov. 2, 1926.

1,605,334

UNITED STATES PATENT OFFICE.

LEROY FARNUM, OF SWAMPSCOTT, AND JOHN W. COSGROVE, OF MEDFORD, MASSA-CHUSETTS, ASSIGNORS TO UNITED SHOE MACHINERY CORPORATION, OF PATERSON, NEW JERSEY, A CORPORATION OF NEW JERSEY.

CEMENTING SYSTEM.

Application filed September 5, 1924. Serial No. 736,086.

Our invention relates to systems for coating, with such adhesives as cement, various objects, for example sole-portions of rubber-shoes, it having particularly to do with that part of the system by which the objects are partially dried and made available for use in succeeding operations. Some work is coated upon both sides, and, when thus treated, is difficult to dispose of by the customary methods. On account of its stickiness, it cannot be stacked, but must be placed between sheets of fabric, or "booked", as this operation is termed. The handling of the pieces for this purpose takes the time of an operative, and is especially troublesome because of their condition. It is an object of this invention to provide for the automatic assembling of the coated objects in a package, ready for utilization, this packaging being accomplished by means which is simple and effective.

In the attainment of this object, as a feature of the invention, we have combined with a conveyor for coated objects, movable means for removing such objects from the conveyor by their adhesion. With this removing means there is associated means for separating therefrom the adhering objects. As illustrated, the removing and separating means are furnished by intermeshing grooved rolls, one resting upon the conveyor and to which the objects traveling therewith adhere, and the other serving to strip from the first-mentioned roll the adhering objects.

To conveniently dispose of the objects removed from the conveyor, we have provided, as a further feature of the invention, a holder receiving such objects and assembling them independently of one another in a package which may be handled easily and the objects removed therefrom for use when desired. More specifically, we prefer to employ for this package a strip, which may be drawn from a supply-reel and wound upon a receiving-reel, the coated objects being delivered between the convolutions as these are formed about the winding-reel.

As still another feature of the invention, the holder for the objects is not only caused to move to properly receive the coated objects from the conveyor, as by the winding of the package-strip, but it is also mounted upon a movable carrier. The movement is preferably at different angles to the conveyor for different purposes. For example, by shifting the holder transversely of the conveyor, the received objects may be distributed advantageously across the width of the former, while, by a movement longitudinally of the conveyor, the holder may be best located for the delivery of objects by the removing means as the location of this is varied. We have herein shown one movement as obtained by a slide upon which the carrier for the holder is mounted, and another by a change in the position of the carrier upon the slide.

Figure 2:
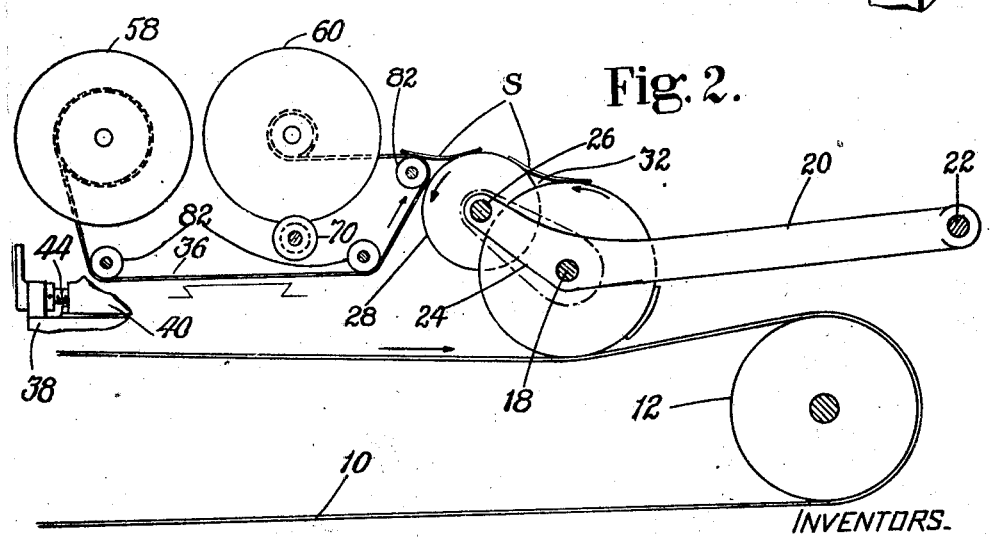

A particular embodiment of our invention is illustrated in the accompanying drawing. Here, Fig. 1 shows, in broken perspective, that portion of a cementing system to which this invention relates; while in Fig. 2 it appears diagrammatically in side elevation.

At 10 is indicated one extremity of a conveyor-belt traveling over a roll 12 journaled in a frame 14. This conveyor is of considerable length, so that soles or other work-pieces advanced by it may have a substantial time in which to dry. At the opposite end of the conveyor from the roll 12, but not appearing in the accompanying drawing, may be placed a suitable cementing machine, such as that disclosed in Patent No. 1,380,361, Cosgrove, June 6, 1921. The coated work-pieces from this machine are delivered upon the upper run of the conveyor. When they arrive at the illustrated end of the conveyor, the cement is substantially set, but is still somewhat tacky. Just before they reach the roll 12, they contact with a roll 16 by which they are removed from the conveyor. This roll 16 is fast upon a shaft 18 journaled horizontally in arms 20, 20 pivoted at 22 upon the frame. The roll 16 is free to swing with the arms and be pressed by the weight of this pivoted device against the surface of the conveyor. The soles against which the roll is thus forced adhere to it, and are removed from the conveyor, being carried upwardly and rearwardly, since the roll is rotated in an anti-clockwise direction, as viewed in Fig. 2 of the drawings, by its frictional engagement with the conveyor. To separate the adhering soles from the roll 16, there is journaled in upturned ends 24 of the arms 20 a shaft 26, upon which is secured a roll 28. Both the rolls 28 and 16 are preferably grooved circumferentially, forming upon them a series of relatively narrow, annular projections 30, which intermesh with each other. Because of this intercurrent arrangement, and since the roll 28 is of comparatively small diameter and has its axis held below the top of the roll 16 by the relation of the supporting arms 24, there is formed by the rolls a continuous, rearwardly inclined delivery-surface, broken only by a slight depression at 32. The roll 28 is shown as driven from the companion roll by sprocket-gearing 34 connecting the shafts 18 and 26. This movement is also anti-clockwise. As a result of this, when the forward end of the object adhering to the roll 16 reaches the surface of the roll 28 in the depression 32, it is raised thereby and carried rearwardly, being at the same time further elevated.

The separating roll 28 delivers to a holder for the objects, which is preferably in the form of a strip 36 of fabric or other suitable material arranged to be rolled with the delivered objects between its convolutions, forming a package which may be conveniently handled and from which the cemented pieces may be removed. Supported upon a platform 38 extending across the frame is a base-plate 40 arranged to slide in ways 42 longitudinally of the conveyor-belt. Screws 44, turning in lugs rising from the platform and threaded into the edge of the slide, allow this to be adjusted toward and from the removing and separating rolls. This permits the package-strip supported on the plate to be brought into sufficiently close proximity to the roll 28 to properly receive the soles from it, the position of this roll varying according to the tension upon the conveyor-belt. Movable transversely of the conveyor, in ways 46 upon the top of the slide 40, is a carrier-plate 48. The position of this carrier-plate may be adjusted, to determine the point at which the work-pieces upon the roll 28 shall be delivered to the strip and thus produce a more uniform distribution, by a hand-lever 50. This lever is shown as fulcrumed upon the platform, and connected by a link 52 to the adjacent extremity of the carrier-plate. By swinging this lever horizontally, the carrier-plate may be moved as desired in its ways 46. Rising from opposite sides of the rear of the plate 48 are standards 54, 54, forked at their upper extremities to receive spindles 56 projecting from the ends of a supply-reel 58 for the strip 36. From the reel 58 the strip is led forward to a winding-reel 60, which may be identical and interchangeable with the reel 58 and having opposite spindles turning in standards 62, 62 upon the carrier-plate. Journaled in extensions 66 from the plate 48 is a horizontal shaft 68 having at its inner end a grooved roll 70 arranged to receive one of the heads or flanges upon the reel 60. At the outer extremity of the shaft 68 is fixed a pulley 72, from which a belt 74 extends to a source of power, the shaft 68 being thereby rotated continuously to exercise a frictional driving action upon the reel 60 through the roll 70. Arranged to swing about the shaft 68 is an arm 76 having at its outer end an upwardly and rearwardly inclined cam-surface 78, which is so located that, upon movement of the arm in a clockwise direction (Fig. 1), it is forced against the adjacent spindle of the reel 60, causing this to be raised and carrying the head of the reel out of driving relation to the roll 70. In this position, the arm may be held by a depression 79 at the end of the cam-surface 78, which receives the spindle of the reel and retains the arm against movement. To thus cam the reel out of engagement with the driving roll and to release it from the depression 79 to restore the driving effect, the arm is provided with an extension 80 serving as a hand-lever. Between the reels the strip is directed in a proper path, particularly to bring it in close proximity to the top of the separating roll 28, by guide-rolls 82.

To outline briefly the operation of the system, work-pieces, as soles S cemented on both sides, travel with the upper run of the conveyor 10, and arrive at the roll 16 in a partially dried but tacky condition. Adhering to this roll, they are raised from the conveyor and elevated by the rotation of the roll until they contact with the roll 28, which separates them from the removing roll and continues their upward and rearward movement. A reel 58 bearing the strip of fabric 36 having been placed in position and its end secured to the reel 60, it is caused to be gradually wound upon the latter reel by rotation imparted by the driving roll 70. To a horizontal run 84 of this traveling strip, between the winding reel and the upper guide-roll 82, the soles are delivered by the roll 28, any tendency of the work to adhere to the latter member being overcome by the lifting action of the strip traveling upwardly at the guide-roll. The soles pass between the convolutions of the strip as these are formed about the winding-reel, being thus held entirely independent of one another. The particular points at which the soles are received by the strip may be determined by shifting the carrier under the influence of the lever 50. If for any reason the supply of soles upon the conveyor 10 ceases, the travel of the package-strip may be discontinued by raising the flange of the winding-reel out of contact with the roll 70 by the lever 80. When all the strip has been wound from the reel 58 upon the reel 60 and the package thus completed, this may be removed from its supports and stored, or turned over to other operators for the succeeding steps of making the shoes. A new reel of fabric and another winding reel being supplied, the system is ready for the formation of another package.

Having described our invention, what we claim as new and desire to secure by Letters Patent of the United States is:

1. In a cementing system, a conveyor for coated objects, and movable means constructed and arranged for contact with the objects to remove them from the conveyor by their adhesion.

2. In a cementing system, a conveyor for coated objects, movable means constructed and arranged for contact with the objects to remove them from the conveyor by their adhesion, and means for separating the objects from the removing means.

3. In a cementing system, a conveyor for coated objects, a coating apparatus delivering to the conveyor, and a removing roll rotatable above the conveyor and arranged to contact with coated surfaces of the objects.

4. In a cementing system, a conveyor for coated objects, and a roll rotatable above the conveyor and arranged to be driven frictionally by the conveyor in its travel and to contact with coated surfaces of the objects.

5. In a cementing system, a conveyor for coated objects, a rotatable roll arranged to be driven frictionally by the conveyor in its travel and to contact with coated surfaces of the objects thereon, and means co-operating with the roll to separate adhering objects therefrom.

6. In a cementing system, a conveyor for coated objects, a roll rotatable above the conveyor and arranged to contact with the objects thereon, and a rotatable roll co-operating with that first mentioned to separate objects therefrom.

7. In a cementing system, a conveyor for coated objects, a rotatable roll arranged to be driven frictionally by the conveyor in its travel and to contact with the objects thereon, a rotatable roll co-operating with that first mentioned to separate objects therefrom, and gearing connecting the rolls.

8. In a cementing system, a conveyor for coated objects, a rotatable grooved roll arranged to contact with the objects upon the conveyor, and object-separating means extending into the grooves.

9. In a cementing system, a conveyor for coated objects, a rotatable grooved roll arranged to contact with the objects upon the conveyor, and a rotatable roll having projections extending into the grooves.

10. In a cementing system, a conveyor for coated objects, arms pivoted to swing above the conveyor, and an object-engaging roll rotatable upon the arms.

11. In a cementing system, a conveyor for coated objects, arms pivoted to swing above the conveyor, intermeshing grooved rolls rotatable upon the arms, one of said rolls resting upon the conveyor, and gearing connecting the rolls.

12. In a cementing system, a conveyor for coated objects, means for removing the objects from the conveyor, and a holder to which the removing means delivers, said holder being constructed and arranged to assemble the coated objects in a package and to maintain them therein separated from one another.

13. In a cementing system, a conveyor for coated objects, movable means constructed and arranged for contact with the objects to remove them from the conveyor by their adhesion, and a device arranged to receive the removed objects and hold them independently of one another.

14. In a cementing system, a conveyor for coated objects, movable means constructed and arranged for contact with the objects to remove them from the conveyor by their adhesion, and a holding device movable for the reception of the objects from the removing means.

15. In a cementing system, a conveyor for coated objects, movable means constructed and arranged for contact with the objects to remove them from the conveyor by their adhesion, a device arranged to receive the removed objects and hold them independently of one another, and means interposed between the removing means and holding device for separating objects from said removing means and delivering them to the holding device.

16. In a cementing system, a conveyor for coated objects, means for removing the objects from the conveyor, and a plurality of reels associated with the conveyor and arranged to carry a package-strip receiving coated objects from said conveyor.

17. In a sole-cementing system, a conveyor for coated soles, a roll rotatable in contact with the conveyor and arranged to remove soles therefrom by their adhesion, and a supply-reel and a winding-reel for a package-strip, said strip being arranged to receive the soles removed from the conveyor by the roll.

18. In a sole-cementing system, a conveyor for coated soles, a supply-reel and a winding-reel for a package-strip, and two intermeshing grooved rolls, one of said rolls contacting with the conveyor and the other roll co-operating with the strip.

19. In a cementing system, a conveyor for coated objects, a carrier movable adjacent to the conveyor, a holder for coated objects mounted to move upon the carrier, and means for delivering the objects from the conveyor to the holder.

20. In a cementing system, a conveyor for coated objects, a carrier movable at different angles to the conveyor, a holder for coated objects mounted to move upon the carrier, and means for delivering the objects from the conveyor to the holder.

21. In a cementing system, a conveyor for coated objects, a carrier movable longitudinally of the conveyor, a holder for coated objects mounted to move upon the carrier, and means for delivering the objects from the conveyor to the holder.

22. In a cementing system, a conveyor for coated objects, a carrier movable transversely of the conveyor, a holder for coated objects mounted to move upon the carrier, and means for delivering the objects from the conveyor to the holder.

23. In a cementing system, a conveyor for coated objects, a slide movable longitudinally of the conveyor, a carrier movable transversely upon the slide, a holder for coated objects mounted upon the carrier, and means for delivering objects from the conveyor to the holder.

24. In a cementing system, a conveyor, a device movable into contact with the conveyor for removing objects therefrom, a carrier movable toward and from the removing device, and a holder for the coated objects mounted upon the carrier and to which the removing device delivers.

25. In a cementing system, a conveyor, a device for removing coated objects from the conveyor, and a supply-reel and a winding-reel for a package-strip to which the removing device delivers, said package-strip being mounted for movement transversely of the conveyor to receive at different points across its width objects from the removing device.

In testimony whereof we have signed our names to this specification.

LEROY FARNUM.
JOHN W. COSGROVE.